US008820468B2

(12) United States Patent
Sekiya (10) Patent No.: US 8,820,468 B2
(45) Date of Patent: Sep. 2, 2014

(54) DUMP TRUCK (71) Applicant: Komatsu Ltd., Tokyo (JP)

(72) Inventor: Shigeo Sekiya, Hitachinaka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 14/233,446

(22) PCT Filed: Jun. 20, 2013

(86) PCT No.: PCT/JP2013/066932
§ 371 (c)(1),
(2), (4) Date: Jan. 17, 2014

(87) PCT Pub. No.: WO2014/069038
PCT Pub. Date: May 8, 2014

(65) Prior Publication Data
US 2014/0182963 A1 Jul. 3, 2014

(30) Foreign Application Priority Data
Oct. 30, 2012 (JP) .................................. 2012-239444

(51) Int. Cl.
B60K 13/04 (2006.01)
B60P 1/04 (2006.01)
B62D 33/067 (2006.01)
B60R 3/00 (2006.01)

(52) U.S. Cl.
CPC . B60K 13/04 (2013.01); B60P 1/04 (2013.01); B62D 33/067 (2013.01); B60R 3/00 (2013.01)
USPC .................. 180/309; 60/274; 60/299; 60/272

(58) Field of Classification Search
USPC ............................ 180/309; 60/274, 299, 272
See application file for complete search history.

(56) References Cited

U.S. PATENT DOCUMENTS 6,725,653 B2 * 4/2004 Brown et al. .................. 60/297
8,418,448 B2 * 4/2013 Kamata et al. ................. 60/322
(Continued)

FOREIGN PATENT DOCUMENTS

| JP | 2002371833 A | 12/2002 |
| JP | 2010096014 A | 4/2010 |
| JP | 2011033011 A | 2/2011 |
| JP | 2011043078 A1 | 3/2013 |

OTHER PUBLICATIONS

International Search Report dated Sep. 24, 2013 from International Application No. PCT/JP2013/066932, 2 pages.

(Continued)

Primary Examiner — Jeffrey J Restifo
Assistant Examiner — Erez Gurari
(74) Attorney, Agent, or Firm — Fish & Richardson P.C.

(57) ABSTRACT

A dump truck includes a cab being located behind an engine compartment in which an engine is enclosed, a body being located behind the cab, and an exhaust aftertreatment device being adapted to purify an exhaust gas from the engine. The exhaust aftertreatment device includes a DPF device being adapted to capture a particulate matter in the exhaust gas and being located on a top of a fender provided alongside the cab, an SCR device being adapted to purify a nitrogen oxide in the exhaust gas and being located between the cab and the body, and a communication pipe through which the DPF device and the SCR device are in communication with each other.

6 Claims, 5 Drawing Sheets

(56) References Cited

U.S. PATENT DOCUMENTS

| | | | |
|---|---|---|---|
| 8,678,127 B2* | 3/2014 | Mitsuda et al. | 180/309 |
| 2006/0137331 A1* | 6/2006 | Lin | 60/295 |
| 2008/0078166 A1* | 4/2008 | Rose et al. | 60/284 |
| 2008/0092531 A1* | 4/2008 | Suzuki et al. | 60/301 |
| 2008/0256936 A1* | 10/2008 | Zuberi | 60/299 |
| 2010/0251698 A1* | 10/2010 | Hiranuma et al. | 60/278 |
| 2010/0326059 A1* | 12/2010 | Mital et al. | 60/297 |
| 2011/0113760 A1* | 5/2011 | Trinkner et al. | 60/297 |
| 2011/0192671 A1* | 8/2011 | Mitsuda et al. | 180/309 |
| 2012/0067661 A1* | 3/2012 | Kashu et al. | 180/309 |
| 2012/0227383 A1* | 9/2012 | Charial et al. | 60/274 |
| 2012/0260634 A1* | 10/2012 | Devarakonda et al. | 60/274 |
| 2013/0111876 A1* | 5/2013 | Qi et al. | 60/274 |
| 2013/0319787 A1* | 12/2013 | Kobayashi et al. | 180/309 |
| 2013/0327017 A1* | 12/2013 | Chavannavar, Praveen S. | 60/274 |

OTHER PUBLICATIONS

Written Opinion of the International Searching Authority, dated Sep. 24, 2013 from International Application No. PCT/JP2013/066932, including English translation, 10 pages.

* cited by examiner

DUMP TRUCK

CROSS-REFERENCE TO RELATED APPLICATIONS

This application claims priority to International Application No. PCT/JP2013/066932 filed on Jun. 20, 2013, which application claims priority to Japanese Application No. 2012-239444, filed on Oct. 30, 2012. The contents of the above applications are incorporated herein by reference in their entireties.

TECHNICAL FIELD

The present invention relates to a dump truck. In particular, the present invention relates to an improved mounting arrangement for an exhaust aftertreatment device equipped in a dump truck.

BACKGROUND ART

To capture particulate matter (PM) in an exhaust gas from an internal-combustion engine such as a diesel engine, a dedicated filter (i.e., DPF: Diesel Particulate Filter) is typically used. In order to comply with exhaust gas regulations, an exhaust aftertreatment device with a DPF is equipped in, for instance, an on-road transport truck using a diesel engine. The exhaust aftertreatment device is usually uncovered and located in an exhaust pipe extending from the engine at a position where the device is likely to be exposed to wind during the traveling of the vehicle (e.g., the lower side of the vehicle).

When an exhaust aftertreatment device is located on the lower side of a dump truck adapted to run on irregular ground such as mines or sludgy soft ground, the exhaust aftertreatment device may be hit by gravel stones thrown up during the traveling of the vehicle or sink into mud along with the vehicle, resulting in damage to the exhaust aftertreatment device. In view of the above, it has been suggested that when an exhaust aftertreatment device is equipped in a dump truck, the exhaust aftertreatment device be located alongside a cab, in which an operator rides, and at such a high position as the top of a fender for the right front wheel (see, for instance, Patent Literature 1, FIG. 1).

According to Patent Literature 1, since an installation space for the exhaust aftertreatment device is separated from an engine compartment, a cooling air from a cooling fan for a radiator is not supplied to the exhaust aftertreatment device. Accordingly, a cooling fan for an aftercooler is located ahead of the exhaust aftertreatment device. A cooling air sucked by this cooling fan is supplied to the aftercooler to cool it and then supplied to the exhaust aftertreatment device located behind the aftercooler. In this manner, even without wind during the traveling or a cooling air from the cooling fan for the radiator, it is possible to prevent an extreme rise in the temperature of the exhaust aftertreatment device.

CITATION LIST

Patent Literature(s)

Patent Literature 1: JP-A-2010-96014

SUMMARY OF THE INVENTION

Problem(s) to be Solved by the Invention

These days, stricter regulations on exhaust gas emission require further purification of an exhaust gas. Accordingly, it is preferred that an exhaust aftertreatment device be equipped with a reduction catalyst that purifies a nitrogen oxide in an exhaust gas in addition to the DPF.

The reduction catalyst is typically located downstream of the DPF. However, when the DPF is located on the top of the fender, it is difficult to secure an installation space for the reduction catalyst, which is located downstream of the DPF, on the top of the fender. In particular, the difficulty in ensuring the installation space becomes prominent in a dump truck adapted to run on irregular ground or soft ground because, for instance, the exhaust aftertreatment device needs to be located at a position where the device can be protected from damage and thus the installation space for the device is further limited.

An object of the invention is to provide a dump truck capable of suppressing damage to a reduction catalyst.

Means for Solving the Problem(s)

According to a first aspect of the invention, a dump truck includes: a cab being located behind an engine compartment in which an engine is enclosed; a body being located behind the cab; and an exhaust aftertreatment device being adapted to purify an exhaust gas from the engine, the exhaust aftertreatment device including: a filter device being adapted to capture a particulate matter in the exhaust gas and being located on a top of a fender provided alongside the cab; a catalyst device being adapted to purify a nitrogen oxide in the exhaust gas and being located between the cab and the body; and a communication pipe through which the filter device and the catalyst device are in communication with each other.

According to the first aspect of the invention, the filter device of the exhaust aftertreatment device is located at such a high position as the top of the fender and the catalyst device of the exhaust aftertreatment device is located between the cab and the body. A vehicle body frame of the dump truck is typically located below such an installation position. Since the installed catalyst device is located above the vehicle body frame, the catalyst device is located at a high position as well as the filter device. With this arrangement, it is possible to suppress damage caused by gravel stones thrown up during the traveling of the vehicle or damage during the traveling of the vehicle on a soft ground to achieve the object of the invention.

Further, the above aspect of the invention can provide the following effects. Specifically, a dead space in, in particular, an articulated dump truck between a cap and a body, which are spaced from each other at a predetermined interval, can be efficiently used by installing the catalyst device in this space. Additionally, the catalyst device can be favorably installed without narrowing the view from the cab. Further, since the filter device and the catalyst device are both located substantially at the same height, these devices can be connected to each other through the communication pipe without extremely vertically bending the communication pipe, which results in simplifying the arrangement of the exhaust aftertreatment device and simplifying an installation arrangement including an arrangement of the communication pipe.

According to a second aspect of the invention, the cab is mounted in an upwardly tiltable manner relative to a vehicle body frame, and the catalyst device is attached on the vehicle body frame to be located between the cab and the body.

According to the second aspect of the invention, since the catalyst device is attached not to the cab that can be tilted up but to the vehicle body frame, the installation position of the catalyst device is not changed even when the cab is tilted up. Thus, the installation position of the catalyst device relative to the filter device is also not changed, so that a structure that compensates for such a position change is not required, which results in further simplifying the installation arrangement.

According to a third aspect of the invention, the dump truck further includes a ladder being located behind the fender and including a plurality of steps outwardly arranged behind a vehicle body, in which the communication pipe extends through between the ladder and the cab.

When the communication pipe is arranged between the cab and the ladder, a repairer or an operator has to ascend or descend the ladder with care not to contact with the heated communication pipe located close to the ladder.

However, according to the third aspect of the invention, the ladder is provided such that the steps of the ladder are outwardly arranged behind the vehicle body. Since the ladder is further distanced from the communication pipe, a repairer or an operator can rapidly ascend or descend the ladder without paying attention to the communication pipe.

According to a fourth aspect of the invention, the dump truck further includes a ladder being located behind the fender and including a plurality of steps, in which the filter device is located such that the exhaust gas flows in parallel with a front-rear direction of the vehicle body, and the communication pipe extends through between the ladder and the cab with a downstream side thereof being inclined inward relative to the front-rear direction of the vehicle body in a plan view.

According to the fourth aspect of the invention, the downstream portion of the communication pipe is inclined toward the inside of the vehicle body to be further distanced from the ladder, so that a repairer or an operator can further smoothly ascend or descend the ladder.

According to a fifth aspect of the invention, the dump truck further includes a cover being adapted to cover at least a portion of the catalyst device and a portion of the communication pipe that are opposed to the ladder.

According to the fifth aspect of the invention, the catalyst device and the communication pipe are covered by the cover to reliably block heat therefrom, so that a repairer or an operator can further smoothly ascend or descend the ladder in no hurry.

DESCRIPTION OF EXEMPLARY EMBODIMENT(S)

Exemplary embodiment(s) of the invention will be described below with reference to the attached drawings.

Figure 1:
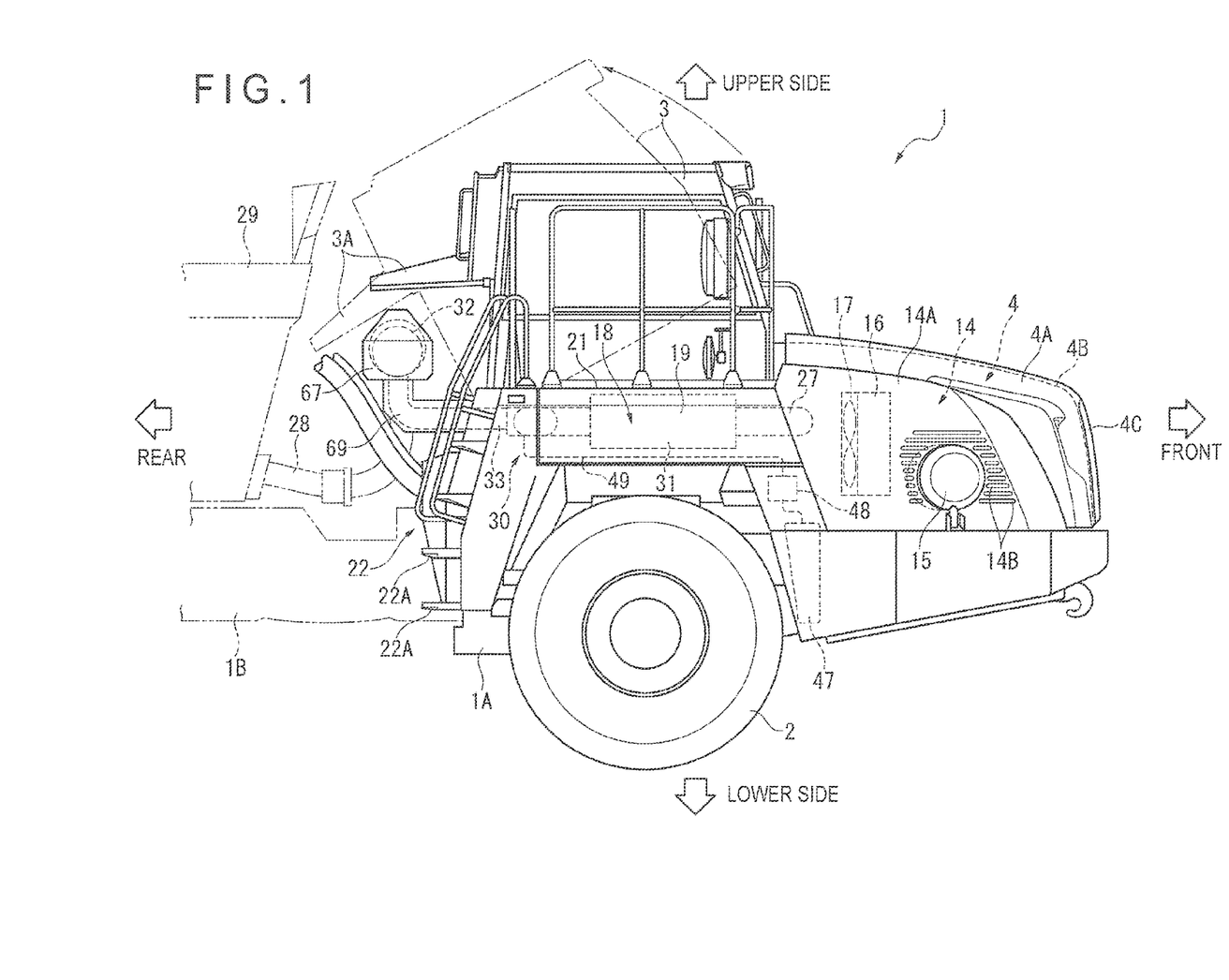
FIG. 1 is a side view showing a relevant part of a dump truck according to an exemplary embodiment of the invention.
Figure 2:
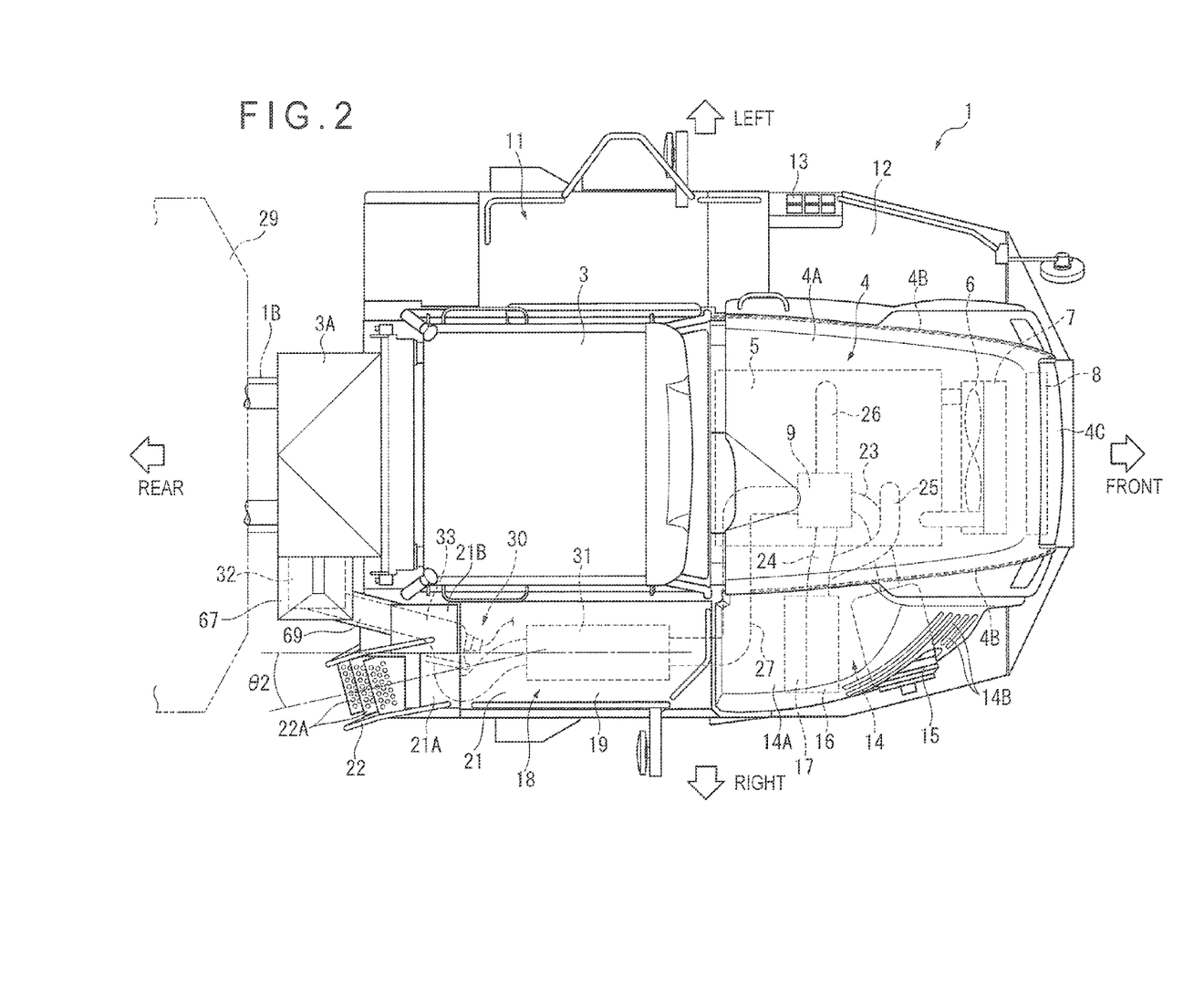
FIG. 2 is a plan view showing the relevant part of the dump truck.
Figure 4:
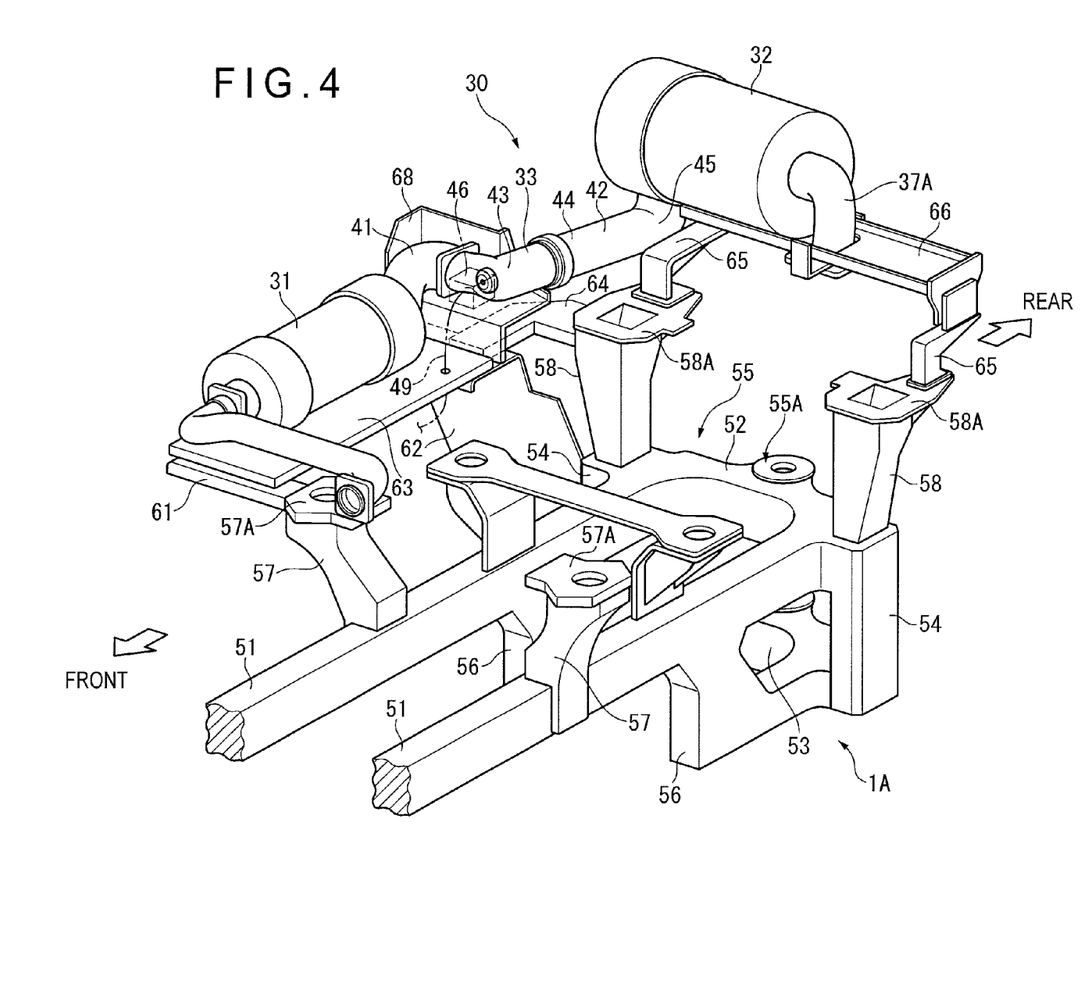
FIG. 4 is a perspective view of a part of a frame of the dump truck and the exhaust aftertreatment device observed from the obliquely upper front.
Figure 5:
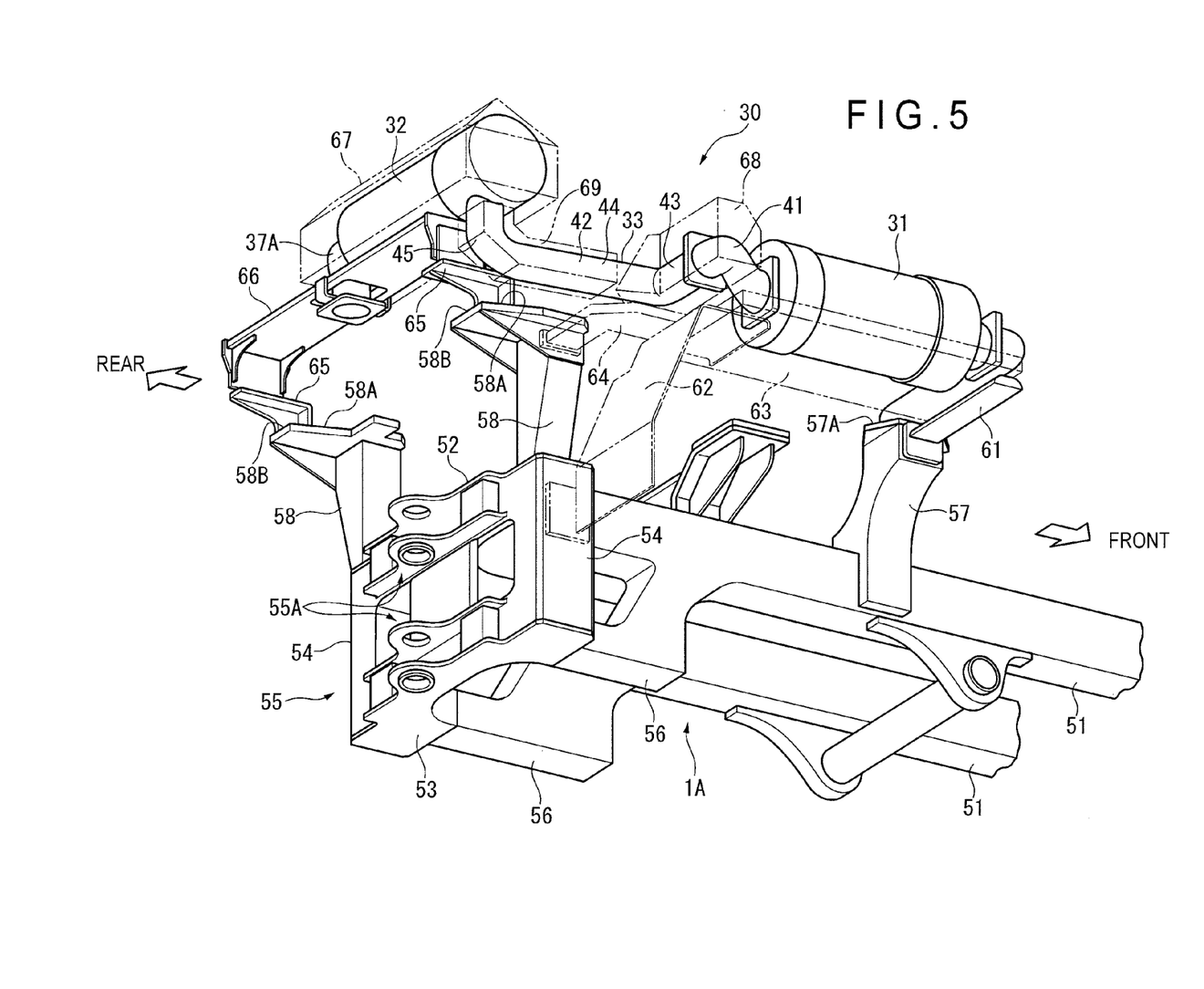
FIG. 5 is a perspective view of the part of the frame of the dump truck and the exhaust aftertreatment device observed from the obliquely lower rear.

FIGS. 1 and 2 are a side view and a plan view showing a relevant part of a dump truck 1 according to an exemplary embodiment, respectively. As shown in FIGS. 1 and 2, the dump truck 1 is an articulated dump truck including a front frame 1A and a rear frame 1B swingably connected to each other via a connecting portion 55A (FIGS. 4 and 5).

Description on Whole Structure of Dump Truck

The front frame 1A (i.e., a vehicle body frame) of the dump truck 1 includes front wheels 2 attached thereto via front axles and front suspensions and a cab 3 mounted thereon via a cab mount for absorbing and damping vibrations. The front frame 1A also includes an engine compartment 4 located in front of the cab 3. While the top of the engine compartment 4 is openably covered with a hood 4A, the right and left sides thereof are covered with partitions 4B.

A diesel engine (hereinafter simply referred to as "engine") 5 is located in the engine compartment 4. In the engine compartment 4, a radiator cooling fan 6 is located in front of the engine 5, a radiator 7 is located in front of the cooling fan 6, and an air-conditioner condenser 8 is located in front of the radiator 7. The engine 5 is equipped with an exhaust turbocharger 9.

A left fender 11, which extends from the left-side front of the engine compartment 4, is located at the left of the cab 3, so that the top of the left fender 11 serves as an access path 12 on which an operator or a repairer can walk. An operator can ascend the access path 12 from the ground using a footboard 13 provided near the front of the left fender 11 and walk rearward to ride in the cab 3. Moreover, when the hood 4A is opened, a repairer can perform maintenance of the inside of the engine compartment 4 while standing on the access path 12. Further, when the cab 2 is rearwardly tilted up as shown in the two-dot chain line in FIG. 1, the repairer can also maintain hydraulic equipment and power transmitter located under the cab 3.

At the right of the engine compartment 4, there is provided a draft chamber 14 covered with a side cover 14A. The draft chamber 14 and the engine compartment 4 are separated with the right partition 4B. In the draft chamber 14, an air cleaner 15, which is partly exposed outside, is located, an aftercooler 16 is located behind the air cleaner 15, and an aftercooler cooling fan 17 is located behind the aftercooler 16.

A right fender 18 is located behind the draft chamber 14, i.e., at the right of the cab 3. A DPF (Diesel Particulate Filter) compartment 19, the top and sides of which are covered, is located on the top of the right fender 18. The front of the DPF compartment 19 is opened to be in communication with the draft chamber 14 in a front-rear direction. The top of the DPF compartment 19 serves as an access path 21. The access path 21, under which the DPF compartment 19 is located, is located higher than the access path 12 at the left side. An operator or the like can ascend the access path 21 from the ground using a ladder 22.

Next, description will be made on the intake of air to be supplied to the engine 5 and the flow of an exhaust gas from the engine 5.

Air entering the air cleaner 15 is supplied to a compressor of the exhaust turbocharger 9 through an intake pipe 23 and pressurized by the compressor. The pressurized air is then sent to the aftercooler 16 through an intake pipe 24. The air is subjected to heat exchange (i.e., cooled) in the aftercooler 16 and then supplied to the engine 5 through the intake pipe 25 and an intake manifold (not shown).

An exhaust gas from the engine 5 is sent to a turbine of the exhaust turbocharger 9 through an exhaust manifold (not shown) and an exhaust pipe 26. After the turbine is driven, the exhaust gas is sent to an exhaust aftertreatment device 30 (described later) through an exhaust pipe 27. After passing through the exhaust aftertreatment device 30, the exhaust gas is sent to an exhaust gas circuit for body heating provided in a rear body 29 through an exhaust pipe 28 (FIG. 1). After passing through the exhaust gas circuit, the exhaust gas is discharged from an exhaust outlet of the body 29. When the body 29 is tilted to be distanced from an end of the exhaust pipe 28, the exhaust gas is discharged directly from the end of the exhaust pipe 28.

Next, description will be made on the flow of a cooling air. When the radiator cooling fan 6 is driven, fresh air (a cooling air) is drawn into the engine compartment 4 through a front grill 4C provided at a front of the hood 4A. Using the cooling air, the air-conditioner condenser 8 is first cooled and the radiator 7 is subsequently cooled. After passing through the radiator 7, the cooling air is directed rearward while cooling the respective surfaces of the engine 5 and the exhaust turbocharger 9 and discharged through a gap between a rear end of the hood 4A and the cab 3 and the like.

Likewise, when the aftercooler cooling fan 17 is driven, fresh air (a cooling air) is drawn into the draft chamber 14 through a plurality of air inlets 14B provided near a front of the side cover 14A. The cooling air is partially used to cool a surface of the air cleaner 15. The cooling air then enters the DPF compartment 19 after cooling the aftercooler 16. The cooling air entering the DPF compartment 19 cools a later-described DPF device 31 (i.e., a filter device) of the exhaust aftertreatment device 30 and is then discharged from the rear of the DPF compartment 19.

The body 29 is supported on the rear frame 1B in an upwardly tiltable manner and is driven by a hoist cylinder including a pair of hydraulic actuators (not shown).

Description on Exhaust Aftertreatment Device

Description will be made below on the exhaust aftertreatment device 30 according to the exemplary embodiment.

Figure 3:
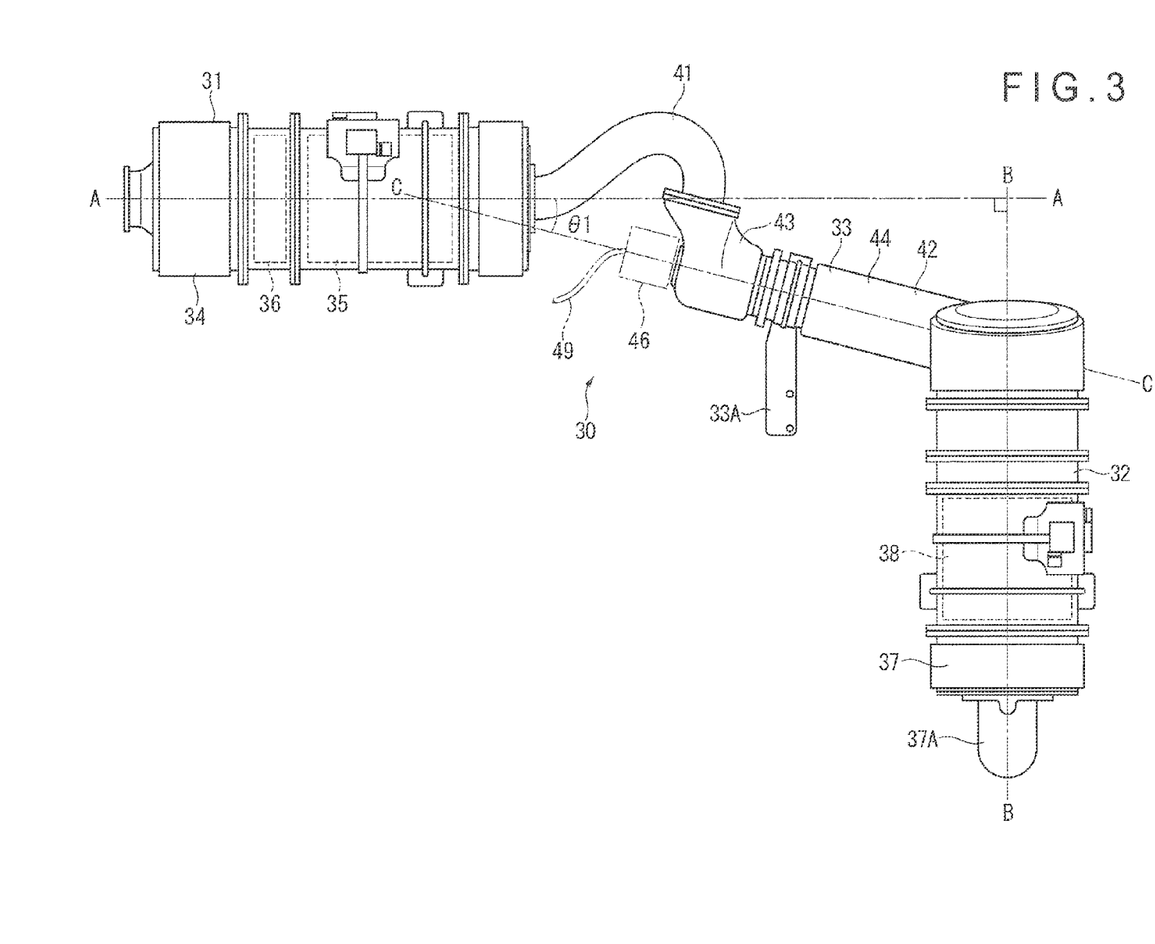
FIG. 3 is a plan view showing an exhaust aftertreatment device equipped in the dump truck.

FIGS. 3 to 5 are a plan view, a perspective view observed from the obliquely upper front, and a perspective view observed from the obliquely lower rear, each showing the exhaust aftertreatment device 30. As shown in FIGS. 3 to 5, the exhaust aftertreatment device 30 includes: a DPF device 31 located in the DPF compartment 19 (FIGS. 1 and 2) and connected to a rear end of the exhaust pipe 27; an SCR (Selective Catalytic Reduction) device 32 (i.e., a catalyst device) located downstream of the DPF device 31 and between the cab 3 and the body 29; and a communication pipe 33 through which a downstream end of the DPF device 31 and an upstream end of the SCR device 32 intercommunicate with each other. The DPF device 31, the SCR device 32 and the communication pipe 33 are located substantially at the same level with a slight difference in height.

The DPF device 31 includes a cylindrical casing 34. An axis A-A of the DPF device 31 is parallel with a front-rear direction of the vehicle. The exhaust gas flows through the DPF device 31 from the front toward the rear thereof along the front-rear direction of the vehicle. In the casing 34, a DPF 35 adapted to capture PM in the exhaust gas and an oxidation catalyst 36 adapted to activate a dosing fuel are housed. The oxidation catalyst 36 is located upstream of the DPF 35. The dosing fuel, which may be the same as a fuel for the engine 5, is supplied into the exhaust gas to cause self-burning (burn-out) of the PM captured by the DPF 35. The dosing fuel may be supplied into a cylinder of the engine 5 by post-injection or be injected into the exhaust pipe 27.

The dosing fuel supplied into the exhaust gas is activated through the oxidation catalyst 36 to raise the temperature of the exhaust gas to a burning temperature of PM. Such a highly heated exhaust gas causes the self-burning of the PM captured by the DPF 35, so that the clogging of the PM is removed to regenerate the DPF 35. The DPF 35 and the oxidation catalyst 36 each have known specific structure and the like, the description of which is omitted herein.

The SCR device 32 likewise includes a cylindrical casing 37. An axis B-B of the SCR device 32 is perpendicular to the front-rear direction of the vehicle, i.e., the axis A-A of the DPF device 31, in a plan view. An outlet pipe 37A provided to the casing 37 is bent vertically downward to be connected to the above-described exhaust pipe 28 (FIG. 1). In the casing 37, a selective reduction catalyst 38 adapted to reduce and purify a nitrogen oxide in the exhaust gas is housed. In the exemplary embodiment, a reductant to be supplied to the selective reduction catalyst 38 is ammonia obtained from a urea aqueous solution. The selective reduction catalyst 38 also has known structure and the like, the description of which is omitted herein. An additional oxidation catalyst for decreasing ammonia may be provided downstream of the selective reduction catalyst 38 to oxidize the excess of the ammonia.

The communication pipe 33 includes a bent pipe 41 forming an upstream portion thereof and a mixing pipe 42 foaming a downstream portion thereof. The bent pipe 41, which is in a curved shape with a large diameter, transversely protrudes relative to the vehicle. Thus, the DPF device 31 and the mixing pipe 42 can be connected to each other through the bent pipe 41 without narrowing the area of a flow path of the bent pipe 41. A bellows pipe is provided in the middle of the bent pipe 41 as needed to prevent transmission of vibrations caused in the DPF device 31 to the mixing pipe 42. An axis C-C of the mixing pipe 42 is inclined relative to the front-rear direction of the vehicle, i.e., the axis A-A of the DPF device 31, by an angle θ1 in a plan view. In other words, a downstream end of the mixing pipe 42 is oriented toward the inside of the vehicle.

More specifically, the mixing pipe 42 includes a first elbow 43 into which the exhaust gas flows perpendicularly to the axis C-C in a plan view and through which the direction of the flow of the exhaust gas is changed to be along the axis C-C; a straight pipe 44 that is located downstream of the first elbow 43 and has a predetermined length along the axis C-C; and a second elbow 45 that is located downstream of the straight pipe 44 and is bent vertically upward relative to the axis C-C. Incidentally, all of the axes A-A, B-B and C-C are horizontal axes.

An injector 46 is attached to the first elbow 43 on an extension of the axis C-C. The urea aqueous solution is injected from the injector 46 into the mixing pipe 42. The urea aqueous solution is drawn from a urea-aqueous-solution tank, which is located ahead of and below the right fender 18 (FIG. 1), by a supply module 48 and supplied to the injector 46 through a supply tube 49. The urea aqueous solution injected from the injector 46 is mixed with the exhaust gas in the straight pipe 44 to be thermally decomposed, thereby obtaining ammonia. The ammonia is supplied as the reductant to the selective reduction catalyst 38 located further downstream through the second elbow 45 to purify the nitrogen oxide in the exhaust gas.

Description on Installation Arrangement of Exhaust Aftertreatment Device

Next, description will be made on an installation arrangement of the exhaust aftertreatment device 30.

As shown in FIGS. 4 and 5, the front frame 1A includes a right and left pair of side members 51 and 51 that extend along the front-rear direction of the vehicle body. A cross member 52 is provided between respective rear ends of the side members 51. A cross member 53 similar to the cross member 52 is provided below the cross member 52. Both ends of the cross member 52 are vertically connected to both ends of the cross member 53 vie vertical support members 54.

The cross members 52 and 53 and the support members 54 in combination provide a frame-shaped articulate support 55. The articulate support 55 is provided with the connecting portion 55A that is connected to the rear frame 1B (FIG. 1) with an articulate pin (not shown). The articulate support 55 is connected to each of the side members 51 via a reinforcing side member 56.

A front pillar 57 stands upright from the longitudinal part of each of the side members 51 while a rear pillar 58 stands upright from a rear end of each of the support members 54. Upper ends of the front pillars 57 and the rear pillars 58 are provided with flat mount faces 57A and 58A, respectively. A lower portion of the cab 3 is mounted on the mount faces 57A and 58A via a cab mount. Additionally, a pivotal mechanism is provided between the mount faces 58A of the rear pillars 58 and the cab 3. The pivotal mechanism enables the cab 3 to be rearwardly tilted up by a predetermined angle (see the two-dotted line in FIG. 1).

An upper portion of the right front pillar 57 is provided with a support frame 61 that extends horizontally rightward. A side of the right vertical support member 54 is provided with a bracket 62 that conforms to the shape of the right fender 18. The bracket 62 is an attachment portion for an accumulator or the like that is incorporated in, for instance, a hydraulic circuit. A rectangular attachment plate 63 is provided between an upper portion of the bracket 62 and the support frame 61. The upper portion of the bracket 62 and an upper portion of the right rear pillar 58 are connected to each other via an L-shaped connecting frame 64. The DPF device 31 is installed on the attachment plate 63 with an appropriate attachment such as a V-clamp.

The mount faces 58A of the right and left rear pillars 58 are provided with attachment faces 58B that extend continuously rearward. The attachment faces 58B are attached with support frames 65 that extend horizontally rearward. A rectangular attachment plate 66 is provided between the support frames 65. The SCR device 32 is installed on the attachment plate 66 with an appropriate attachment such as a V-clamp. The attachment plate 66 is further provided with a hut-shaped cover 67 that wholly covers the SCR device 32.

While both ends of the communication pipe 33 are supported by the DPF device 31 and the SCR device 32, the communication pipe 33 is attached to the above-described L-shaped connecting frame 64 via a bracket 33A provided to a part of the communication pipe 33 (FIG. 3). The mixing pipe 42 of the communication pipe 33 is inclined relative to the front-rear direction of the vehicle body (i.e., the same direction as the axis A-A of the DPF device 31) by the angle θ1 in a plan view as described above to be efficiently arranged in a narrow space between the cab 3 and the ladder 22 (FIG. 2).

A downstream portion of the communication pipe 33 relative to the vicinity of a rear end of the bent pipe 41 protrudes relative to the DPF compartment 19. A portion including the rear end of the bent pipe 41 and the first elbow 43 of the mixing pipe 42 is covered from the side and bottom by a cover 68. This portion is also covered from above by plate-shaped footboards 21A and 21B that are provided continuously with the access path 21 (FIG. 2). Further, the mixing pipe 42 is covered by a cover 69 with a square C-shaped section that is opened toward the inside of the vehicle body.

The SCR device 32 and at least a portion of the communication pipe 33 opposed to the ladder 22 are covered by the covers 67, 68 and 69 as described above. With this arrangement, even though the ladder 22 is located adjacent to the SCR device 32 and the communication pipe 33, a repairer or an operator can ascend or descend the ladder 22 without easily contacting with the heated SCR device 32 and communication pipe 33. Further, heat from the SCR device 32 and the communication pipe 33 can be blocked.

Additionally, the ladder 22 according to the exemplary embodiment includes a plurality of steps 22A. The steps 22A are each inclined relative to the front-rear direction of the vehicle body (i.e., the same direction as the axis A-A of the DPF device 31) by the angle θ2 in a plan view (FIG. 2) and outwardly arranged behind the vehicle body. With this arrangement, when a repairer or an operator ascends or descends the ladder 22, he is further distanced from the SCR device 32 and the mixing pipe 42 of the communication pipe 33 and thus unlikely to easily contact with them. Further, since the mixing pipe 42, which extends through the narrow space between the cab 3 and the ladder 22, has a downstream portion that is inclined relative to the axis A-A by the angle θ1 (FIG. 3) oppositely to the inclination by the angle θ2 in a plan view, the mixing pipe 42 is getting remoter from the ladder 22 toward the rear, which also makes the SCR device 32 and the mixing pipe 42 less contactable.

When the exhaust aftertreatment device 30 is installed as described above, the SCR device 32 is located between the cab 3 and body 29 in the front-rear direction of the vehicle body as shown in FIGS. 1 and 2. The SCR device 32 is located on the right relative to the center in a right-left direction of the vehicle body. Considering connection to the exhaust pipe 28, the outlet pipe 37A provided to the SCR device 32 has a downstream end substantially centered in the right-left direction of the vehicle body. The SCR device 32 is located in an up-down direction not to be in contact with an eave-shaped guard 3A provided behind the cab 3. Such a vertical position means a position where the SCR device 32 does not contact with the cab 3 and the guard 3A even when the cab 3 is rearwardly tilted up (see the two-dotted line in FIG. 1).

Incidentally, the guard 3A is intended to protect a valve device for a hydraulic circuit located below the SCR device 32 from fallen rocks and the like during loading. The guard 3A, however, also serves to protect the SCR device 32 to suppress damage to the SCR device 32 and/or the cover 67 that covers the SCR device 32. Further, the SCR device 32 is located at the height behind the cab 3, so that the SCR device 32 is prevented from being hit by gravel stones and the like thrown up during the traveling of the dump truck 1 and from sinking into soft ground even when the vehicle body sinks. Also for the above reasons, damage to the SCR device 32 can be suppressed.

The scope of the invention is not limited to the above exemplary embodiment but may include any modification, improvement or the like as long as it is compatible with the scope of the invention.

For instance, although the cab 3 is pivotally supported on the front frame 1A and can be tilted up rearward in the exemplary embodiment, the cab 3 may be tilted up in any direction according to the invention. Thus, the cab 3 may be tilted up forward or sideward or may not be tilted.

Although the SCR device 32 of the exhaust aftertreatment device 30 is attached to the front frame 1A via the support frame 65 in the exemplary embodiment, the SCR device 32 may be attached on the rear or the like of the cab without departing from the scope of the invention. In particular, when the cab is not tilted up relative to the front frame, the SCR device may be attached on the rear or the like of the cab because the position thereof is not considerably changed.

However, a typical cab is mounted on the front frame via a cab mount for absorbing/damping vibrations, so that a vibration system of the cab is different from that of the front frame. For the above reason, when the DPF device and the communication pipe are attached on the front frame in addition to the exhaust aftertreatment device, for instance, a bellow pipe or the like needs to be provided between the communication pipe and the SCR device to absorb different vibrations therefrom, which complicates the structure. Accordingly, in the above case, it is preferable that the SCR device be also attached on the front frame as in the exemplary embodiment.

The invention claimed is:

1. A dump truck comprising:
    a cab being located behind an engine compartment in which an engine is enclosed;
    a body being located behind the cab; and
    an exhaust aftertreatment device being adapted to purify an exhaust gas from the engine, the exhaust aftertreatment device comprising:
    a filter device being adapted to capture a particulate matter in the exhaust gas and being located on a top of a fender provided alongside the cab;
    a catalyst device being adapted to purify a nitrogen oxide in the exhaust gas and being located between the cab and the body; and
    a communication pipe through which the filter device and the catalyst device are in communication with each other.

2. The dump truck according to claim 1, wherein
    the cab is mounted in an upwardly tiltable manner relative to a vehicle body frame, and
    the catalyst device is attached on the vehicle body frame to be located between the cab and the body.

3. The dump truck according to claim 1, further comprising a ladder being located behind the fender and comprising a plurality of steps outwardly arranged behind a vehicle body, wherein
    the communication pipe extends through between the ladder and the cab.

4. The dump truck according to claim 1, further comprising a ladder being located behind the fender and comprising a plurality of steps, wherein
    the filter device is located such that the exhaust gas flows in parallel with a front-rear direction of the vehicle body, and
    the communication pipe extends through between the ladder and the cab with a downstream side thereof being inclined inward relative to the front-rear direction of the vehicle body in a plan view.

5. The dump truck according to claim 3, further comprising a cover being adapted to cover at least a portion of the catalyst device and a portion of the communication pipe that are opposed to the ladder.

6. The dump truck according to claim 4, further comprising a cover being adapted to cover at least a portion of the catalyst device and a portion of the communication pipe that are opposed to the ladder.

* * * * *